United States

Simpkin et al.

[11] 3,686,956
[45] Aug. 29, 1972

[54] STRUCTURE FOR CONTINUOUS MONITORING OF SHAFT VIBRATION MAGNITUDE AND PHASE ANGLE

[72] Inventors: Lawrence J. Simpkin, Dearborn Heights; Richard M. Srodawa, Detroit, Mich.

[73] Assignee: The Detroit Edison Company, Detroit, Mich.

[22] Filed: Aug. 10, 1970

[21] Appl. No.: 62,431

[52] U.S. Cl..................................73/462, 73/71.4
[51] Int. Cl..............................................G01m 1/22
[58] Field of Search.................73/67, 71.2, 71.4, 462

[56] References Cited

UNITED STATES PATENTS

| | | | |
|---|---|---|---|
| 3,201,996 | 8/1965 | Silvia | 73/67 X |
| 2,783,648 | 3/1957 | Stovall, Jr. et al. | 73/462 |
| 3,048,041 | 8/1962 | Trimble | 73/462 |
| 3,477,280 | 11/1969 | Blackmer | 73/71.4 |
| 2,363,373 | 11/1944 | Werner | 73/71.4 X |

FOREIGN PATENTS OR APPLICATIONS

| | | | |
|---|---|---|---|
| 1,129,477 | 10/1968 | Great Britain | 73/462 |

*Primary Examiner*—Richard C. Queisser
*Assistant Examiner*—John B. Beauchamp
*Attorney*—Whittemore, Hulbert and Belknap

[57] ABSTRACT

Structure for and method of continuously monitoring and recording the magnitude and phase angle of vibration of a rotary shaft is disclosed. The structure includes means for integrating a vibration proportional, velocity signal to provide a sinusoidal signal having an amplitude magnitude proportional to vibration magnitude and means for rectifying and integrating the sinusoidal signal to provide a direct current signal proportional to the magnitude of vibration, structure for shaping the sinusoidial signal and subsequently differentiating it to provide relatively sharp electrical signals representing a particular angular position of vibration magnitude measurement which sharp signals are operable together with other relatively sharp electrical signals representing a predetermined angular zero position on the rotating shaft obtained from a pickup probe mechanically associated with the shaft and timing pulse amplifying and shaping structure, to set and reset a multivibrator and means for integrating the output of the multivibrator to provide a direct current signal proportional to the relative phase angle of the vibration magnitude recorded. A zero adjust structure and method is provided for both of the vibration magnitude and phase angle monitoring and recording means.

7 Claims, 3 Drawing Figures

Patented Aug. 29, 1972

INVENTOR
LAWRENCE J. SIMPKIN
RICHARD M. SRODAWA
BY *Whittemore*
*Hulbert & Belknap*

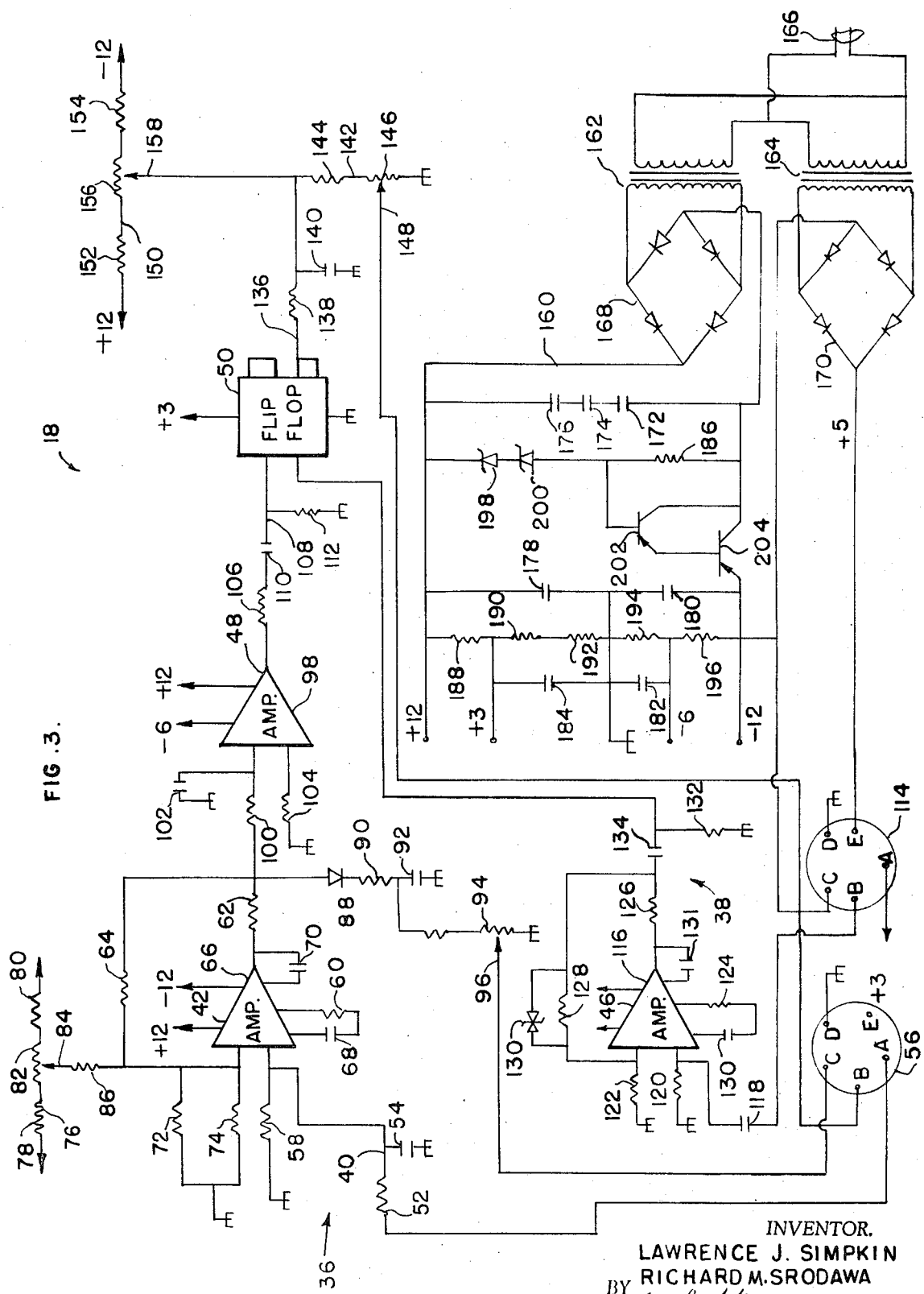

STRUCTURE FOR CONTINUOUS MONITORING OF SHAFT VIBRATION MAGNITUDE AND PHASE ANGLE

BACKGROUND OF THE INVENTION

1. Field of the Invention

The invention relates to monitoring equipment for rotating shafts and refers more specifically to structure for and a method of continuously monitoring the magnitude of vibration of a rotating shaft and the phase angle of the monitored vibration magnitude.

2. Description of the Prior Art

In the past, vibration magnitude sensing and the sensing of the phase angle at which the vibration magnitude sensed occurred has been a relatively complicated and often inefficient procedure. Prior structures for vibration magnitude and phase angle sensing has often been capable of providing only discrete separate indications rather than a continuous record of vibration magnitude and phase angle of the vibration magnitude over an extended period. The equipment for performing such measurements has also been expensive and therefore prohibitive in many instances.

The continuous monitoring of vibration magnitude and phase angle is desirable to aid in the diagnosis of the cause of the vibration; for example, a history of vibration magnitude and the phase angle at which the vibration magnitude is recorded is useful in determining continued wear of a rotating shaft or the like since the phase angle in such cases will gradually change. The continuous recording of the vibration magnitude and phase angle at which the vibration magnitude occurs is therefore extremely desirable in analyzing the operation of a rotating shaft over an extended period.

SUMMARY OF THE INVENTION

In accordance with the invention, there is provided a circuit for a method of monitoring the magnitude of vibration of a rotating shaft and the relative phase angle of the vibration of the rotating shaft over an extended period of time in conjunction with one or more vibration pickups mounted on a member vibrating in accordance with the vibration of the rotating shaft and timing signal producing means operably associated with the rotating shaft to provide a phase angle reference signal. The monitored vibration magnitude and phase angle is continuously recorded to provide a permanent record thereof whereby shaft operation may be diagnosed.

BRIEF DESCRIPTION OF THE DRAWINGS

FIG. 3 is a schematic diagram of the electric circuit, for providing a direct current signal proportional to vibration magnitude and the phase angle at which the vibration magnitude monitored occurs continuously, of the structure of the invention.

DESCRIPTION OF THE PREFERRED EMBODIMENT

Figure 1:
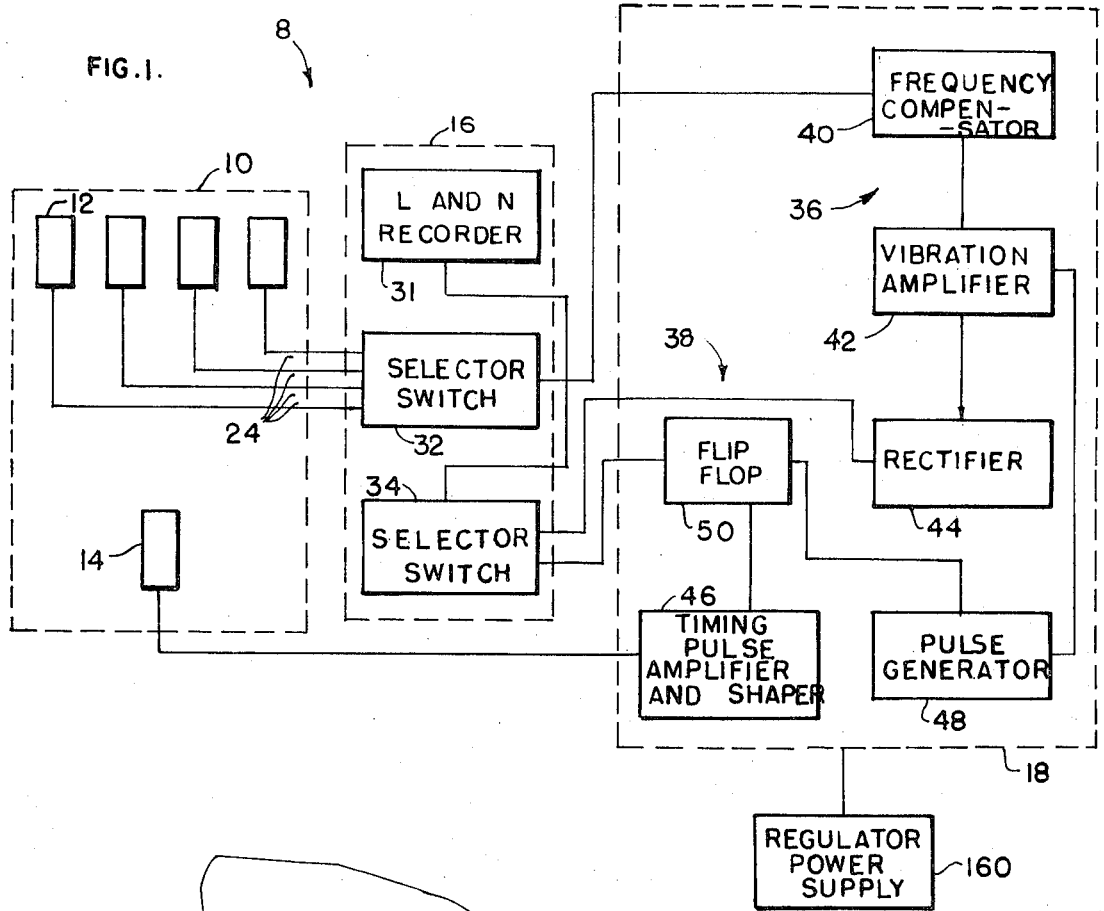
FIG. 1 is a block diagram of vibration magnitude and phase angle monitoring and recording structure constructed in accordance with the invention.

As shown best in FIG. 1, the structure 8 for continuously monitoring the magnitude of vibration of the vibrating shaft 22 and the phase angle at which the vibration occurs includes sensing structure 10 comprising one or more vibration pickup structures 12 and a timing signal pickup structure 14, a recording unit 16 and an electronic circuit 18 for receiving vibration signals from the vibration pickup structures 12 through the recording unit 16 and for receiving a timing signal from the timing signal pickup structure 14 and for returning a direct current signal proportional to the magnitude of the vibration sensed and a direct current signal proportional to the phase angle of the vibration signal sensed to the recording unit 16. The recording unit is operable to cyclically record the magnitude of vibration and the phase angle at which the vibration occurred for each of a plurality of vibration pickup structures 12 in sequence.

Figure 2:
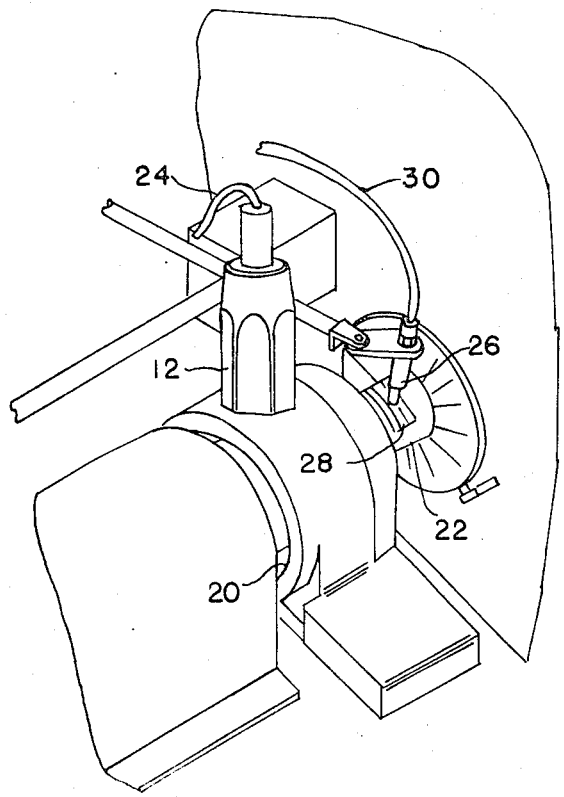
FIG. 2 is a pictorial representation of the timing pulse generating structure and the vibration sensing and transducing structure of the structure of the invention illustrating their application to a rotating shaft, the vibration of which is to be monitored thereby.

As shown best in FIG. 2, the vibration pickup structures 12 may be secured to collars 20 mounting the shaft 22, the vibration of which is to be monitored, in bearings or the like. The vibration pickup structures 12 may be electro-magnetic devices constructed and energized to provide an output over conductors 24 to the recording unit 16 which is proportional to the velocity of the portion of the collars 20 to which the vibration pickup structures 12 are secured.

Piezoelectric crystal devices for providing an electrical output signal in proportion to the pressure applied thereto or other sensitive accelerometer devices may be used to provide the output signal on the conductors 24 proportional to the velocity of movement of the portion of the collars 20. In addition, the vibration pickup structures 12 may be positioned at a plurality of separate linearly and angularly spaced positions along the shaft 22, as desired.

The timing signal pickup structure 14, as shown best in FIG. 2, includes a photoelectric device 26 positioned adjacent the shaft 22 in conjunction with a portion of the shaft 22 which has been painted to provide a sharp line 28 of contrasting color. Thus, as the shaft 22 rotates when the sharp line between the contrasting colors on the shaft 22 passes the photoelectric device 26, an electric signal due to a difference in the reflected light on opposite sides of the line 28 will be provided on the conductor 30. The signal on the conductor 30 may be considered as a zero phase angle reference signal.

The recording unit 16 is a purchased four-channel Leeds & Northrup recording unit. The recording unit 16 may of course be any other commercially available unit which will provide multiple-channel recording and which includes, along with a recorder 31, as shown in FIG. 1, a first selector switch 32 and a second selector switch 34 cooperable to first receive a vibration magnitude signal from one of the vibration pickup structures 12 and to subsequently record the vibration magnitude and the phase angle of the vibration magnitude sensed by the first vibration magnitude pickup structure 12 and to then select a second of the vibration magnitude pickup structures 12 to record the magnitude of vibration from the second vibration magnitude pickup structure and the phase angle thereof and to continue such selecting and recording of the different vibration pickup structures 12 until the vibration magnitude and phase angle monitored by the last vibration magnitude pickup structure 12 is recorded and then to start over again recording the magnitude and phase angle of the shaft vibration associated with the first vibration magnitude pickup structure 12.

With the particular Leeds & Northrup recording unit 16, magnitude of vibration and phase angle of the vibration monitored by a single vibration pickup structure has been recorded every fifteen seconds so that with the four vibration magnitude pickup structures illustrated, each vibration magnitude and phase angle was monitored once every minute and the recording continued over an extended period.

The vibration magnitude and phase angle signal producing circuit 18, shown best in FIG. 3, includes a vibration magnitude signal producing portion 36 and a phase angle signal producing portion 38. The vibration magnitude signal producing portion 36 includes the frequency compensator 40, the vibration magnitude amplifier 42 and the rectifier 44. The phase angle signal producing portion 38 of the circuit 18 includes the timing pulse amplifier and shaper 46, the pulse generator 48 and the flip-flop 50.

As shown better in FIG. 3, the frequency compensator 40 of the portion 38 of the circuit 18 is an integrating circuit including the resistor 52 and the capacitor 54. The frequency compensator 40 is operable to integrate the velocity signal provided from a vibration pickup structure 12 through the recording unit selector switch 32 from plug 56 and to provide a substantially sinusodial signal therefrom, the magnitude of which is proportional to the magnitude of vibration of the shaft 22 at the position monitored by the vibration pickup structure 12, which sinusodial signal is applied to the vibration amplifier 42.

The vibration amplifier 42 is a standard operational amplifier operable to take an extremely small sinusodial signal and to provide a larger sinusodial signal output therefrom, the magnitude of which is again proportional to the magnitude of the monitored shaft vibration. Resistors 58, 60, 62 and 64 are standard input, internal balancing, output and feedback resistors in the circuit of the operational amplifier 66 and will not therefore be considered in detail herein. Capacitors 68 and 70 are similarly standard components of operational amplifiers such as 66 and will therefore not be considered in detail.

Resistors 72 and 74 are input resistors for the other side of the operational amplifier 66 and in conjunction with the voltage divider 76 including resistors 78 and 80 and the potentiometer 82 having the wiper arm 84 in series with the resistor 86 provides a zero vibration magnitude adjust circuit for the operational amplifier 66. Thus, the wiper arm 84 may in operation be positioned to provide a zero output from the operational amplifier 66 when the signal from the pickup structure 12 indicates that the vibration magnitude of the shaft 22 is zero.

The amplified sinusoidal output signal from the operational amplifier 66 is rectified through the rectifier 88 and is subsequently integrated through the averaging circuit including the resistor 90 and the capacitor 92 to provide a direct current output signal across the selected portion of the potentiometer 94 chosen by the position of the wiper arm 96 associated therewith, the magnitude of which is proportional to the vibration of the shaft 22 at the vibration pickup structure 12. As indicated previously, this signal is passed through selector switch 34 in recording unit 16 to the recorder 31 in recording unit 16 for sequential recording in one of the channels thereof.

The sinusoidal signal from the operational amplifier 66 is further passed to the pulse generator 48 of the phase angle monitoring portion 38 of the circuit 18. The pulse generator 48, as shown in FIG. 3, includes an operational amplifier 98 having an in put resistance 100 associated with the capacitor 102, a second input resistance 104 for the opposite side thereof which as shown is connected to the ground and an output circuit 106. Operational amplifier 98 again is a conventional circuit and includes the usual feedback and other circuit components which are known to those in the art. The output signal from the operational amplifier 98 is substantially a square wave signal at the frequency of the sinusoidal input signal thereto. The square wave signal from the operational amplifier 98 is differentiated in the differentiating portion 108 of the pulse generator 48 which includes the capacitor 110 and the resistor 112 to provide a series of positive and negative going spike-like signals to the flip-flop 50. The positive spikes are substantially synchronized with the initiation of the positive portion of the vibration magnitude signals.

The timing pulse amplifier and shaper 46 of the portion 38 of the circuit 18 receives a pulse from the light sensitive timing signal pickup structure 14 through the plug 114 in FIG. 3 at pin B each time the line 28 on the shaft 22 rotates past the signal pickup structure 14 whereby the light reflected into the pickup structure 14 is varied sharply. The timing signal thus generated is passed to the operational amplifier 116 through the capacitor 118 and across the usual input resistance 120. Again, the resistors 122, 124, 126 and 128 and the capacitors 130 and 131 associated with the operational amplifier 116 are conventional and will not be considered in detail herein.

It will be noted, however, that the resistor 128 is bypassed by voltage limiting structure 130 whereby the output of the amplifier 116 is clipped to provide a substantially square wave output to the differentiating structure including the resistor 132 and capacitor 134 which receive the output from the amplifier 116. The differentiated square wave passed through the capacitor 134 and across the resistor 132 is thus also passed to the flip-flop 50 and includes positive and negative spikes, the positive spikes of which are substantially synchronized with the rotation of the shaft 22 since they are ultimately produced as a result of the line 28 on shaft 220.

The flip-flop 50 which is actually a dual NOR gate flip-flop is sensitive only to positive signals. Thus, the positive spikes ultimately produced from the timing signal pickup structure 14 is operable to provide an output from the lower portion of the flip-flop 50 on the conductor 136 and the positive spike from the operational amplifier 98 developed ultimately from the magnitude of vibration pickup structure 12 is operable to cut the signal from the lower portion of the flip-flop 50 on conductor 136 off at a subsequent time during the same revolution of the shaft 22.

The signal on the conductor 136 will thus be a square wave having a pulse width proportional to the phase angle difference between the reference phase angle established by the line 28 on the shaft 22 and the phase angle determined by the time of occurrence of the positive spike ultimately produced by the vibration.

The square wave on the conductor 136 is then averaged through the resistor 138 and across capacitor 140 to provide a direct current signal across the voltage divider 142 including the resistor 144 and the potentiometer 146 which includes the variable wiper arm 148, the magnitude of which represents the phase angle of the vibration magnitude monitored. This phase angle signal is passed to the recording unit 16 through the recording unit plug 56 for recording in conjunction with the magnitude of vibration signal as previously indicated.

Again, a voltage divider 150 including resistances 152 and 154 and potentiometer 156 including the wiper arm 158 is provided in conjunction with the voltage divider 142 to provide zero adjust structure, whereby the integrated output signal from the flip-flop 50 will be zero when the phase angle of the vibration magnitude sensed is exactly the same as the reference phase angle determined by the line 28.

The circuit 18 is completed by the power supply 160. Power supply 160 is conventional and includes the transformers 162 and 164 which are fed from a usual 115-volt, 60-cycle alternating current supply through plug 166 and which feed the bridge rectifiers 168 and 170. Rectifier 170 provides a positive five-volt output for the timing signal pickup structure 14 through the plug 114. Rectifier 168 provides positive 12, positive 3, negative 6 and negative 12-volt output signals which are filtered by capacitor means 172, 174, 176, 178, 180, 182 and 184 in conjunction with resistors 186, 188, 190, 192, 194 and 196. The voltages from the rectifier 168 are regulated by the Zener diodes 198 and 200 in conjunction with the transistors 202 and 204 connected as shown in FIG. 3.

Thus, in overall operation of the structure for and method of continuous monitoring of shaft vibration magnitude and phase angle in accordance with the method of the invention, the vibration magnitude pickup structures 12 are secured to structure such as the collar 20 associated with the shaft 22 so that they vibrate in accordance with the vibration of the shaft 22. The timing input pickup structure 14 is positioned adjacent the rotary shaft 22 having the sharp demarcation line 28 between contrasting colored surfaced such as black and white surfaces and the shaft 22 is rotated As the shaft rotates, the recording unit 16, through selector switch 32, first selects one of the vibration magnitude pickup structures 12 for monitoring along with the timing signal pickup structure 14. The velocity signal from the vibration pickup structure 12 is integrated in the frequency compensator structure 140, is amplified in the vibration amplifier 42 which has previously been zeroed by the structure associated with the voltage divider 76. The amplified sinusoidal wave from the amplifier 42 which is proportional in magnitude to the vibration of the shaft 22 is then rectified and integrated to provide a direct current signal proportional to the magnitude of the vibration of the shaft 22 at the vibration pickup structure 12, which signal is presented to the selector switch 34 in the recording unit 16 for recording on recorder 31.

During the rotation of the shaft 22, the line 28 between the contrasting light reflecting surfaces on the shaft 22 passes the photoelectric device 26 to provide an electrical timing signal, which signal is amplified and shaped in the timing pulse amplifier and shaper 46 and is presented to the flip-flop 50 to cause the flip-flop 50 to provide an output signal to the selector switch 34 from one side thereof of a regulated magnitude.

During the rotation of the shaft 22, the amplified sinusoidal signal having a magnitude proportional to the magnitude of the vibration of shaft 22 at the position of the vibration pickup structure 12 is also passed to the pulse generator 48 which squares the sinusoidal wave shape and provides a series of spike signals therefrom by integration of the square wave signal. The positive spike signals are fed to the flip-flop 50 to stop the output from the one side thereof. Thus, the output from the flip-flop 50 is proportional to the phase angle difference between the phase angle of the line 28 and the phase angle of the sinusoidal signal proportional to the magnitude of the vibration of the shaft 22.

The signal from the one side of the flip-flop 50 is then integrated to provide an output signal across the voltage divider 142 which is a direct current signal proportional to the indicated phase angle difference. The signal from the flip-flop 50 is compensated by the structure associated with the voltage divider 150 to provide a zero output when the phase angle indicated above is zero.

The vibration magnitude signal and the phase angle signals from the rectifier 44 and the flip-flop 50 are sequentially passed to the recording portion of the recording structure 16 by the selector switch 34.

Subsequent operation of the structure 8 will be in exact repetition of the above indicated operation except the selector switch 32 will sequentially select the vibration magnitude pickup structures 12 in sequence and then start over again with the initially selected vibration magnitude pickup structure 12. Such operation will continue until the structure 8 is deenergized to provide a continuous graph of the vibration magnitude and phase angle of the vibration of shaft 22 at various locations therealong. As indicated above, such information is particularly useful in monitoring the long term operation of shaft 22 and in diagnosing the causes of the vibration of the shaft 22. Also, such information may be used with known computer techniques for providing balancing weights to remove the vibration from the shaft 22, if desired.

While one embodiment of the present invention has been considered in detail, it will be understood that other modifications and embodiments are contemplated. It is the intention to include all modifications and embodiments of the invention as are defined by the appended claims within the scope of the invention.

What we claim as our invention is:

1. Structure for continuously monitoring vibration of an installed rotating shaft over a prolonged period comprising a first probe operably associated with the shaft for developing a sinusoidal electrical signal the amplitude of which is proportional to the velocity of radial movement of the shaft at the first probe in the direction of the first probe, a first operational amplifier connected to the first probe for receiving and amplifying the developed signal from the first probe, a rectifier connected in series with the first operational amplifier for rectifying the output thereof, an integrating circuit connected to the rectifier for integrating the rectified sinusoidal output from the first operational amplifier, a first variable resistance connected to the integrating circuit for receiving the output thereof, means for tapping a predetermined portion of the direct current output signal from the first variable resistance and means for recording the portion of the direct current output from the first variable resistance as a direct measure of shaft vibration magnitude, a second operational amplifier connected to receive the sinusoidal signal output of the first operational amplifier and providing a square wave output therefrom, a differentiating circuit connected to receive the square wave output signal of the first operational amplifier and to provide a pulsed output in response thereto, a second probe positioned adjacent the shaft, means for providing a pulse of electrical energy in the second probe each time the shaft completes a rotation relative to the second probe, a third operational amplifier connected to the second probe for sensing the pulses of electrical energy produced by the second probe and providing an output signal synchronized with the rotation of the shaft, a differentiating circuit for receiving the output signal from the third operational amplifier and providing a pulsed output in response thereto, a dual NOR gate flip-flop circuit connected to receive the differentiated square wave signal from the second operational amplifier and the differentiated signals from the third operational amplifier so that one side of the flip-flop circuit provides an output signal between the time a signal is provided at the one side of the flip-flop circuit from the third operational amplifier and the time a signal is provided at the flip-flop circuit on the other side thereof from the second operational amplifier, means for integrating the output signal from the one side of the flip-flop circuit to provide a direct current signal proportional thereto, a variable resistance for receiving the integrated output signal from the one side of the flip-flop circuit and means for tapping off a portion of the direct current signal from the second variable resistance and for recording the portion of the signal from the second variable resistor as a direct indication of the phase angle of the vibration of the shaft.

2. A plurality of structures as set forth in claim 1 positioned in spaced apart locations longitudinally of the shaft whereby continuous recording of the magnitude of shaft vibration and phase angle of the shaft vibration may be simultaneously recorded at different points along the shaft over prolonged periods.

3. Structure as set forth in claim 1 wherein the signal from the first probe is fed into one side of the first operational amplifier, and further including a voltage divider, a bias power supply connected across the voltage divider and means for connecting a variable point of the voltage divider to the other side of the first operational amplifier whereby the output of the first operational amplifier may be reduced to zero with no input signal to the first operational amplifier from the first probe.

4. Structure as set forth in claim 1 and further including a voltage divider, a bias power supply connected across the voltage divider, means for connecting a variable point on the voltage divider between the integrating means receiving the output from the one side of the flip-flop circuit and the second variable resistor whereby the output signal of the flip-flop circuit to the voltage divider can be maintained at zero with a zero input to the one side of the flip-flop circuit.

5. Structure as set forth in claim 1 wherein the first probe is an electromagnetic velocity sensitive probe secured to a mounting bearing for the shaft.

6. Structure as set forth in claim 1 wherein the second probe is a light sensitive probe and means are provided on the shaft adjacent the second probe for abruptly changing the light reflective qualities of the shaft at one location around the circumference thereof.

7. A plurality of structures for continuously monitoring vibration of an installed rotating shaft at a plurality of locations along the length thereof over a prolonged period each comprising a first electromagnetic velocity sensitive probe secured to a mounting bearing for the shaft for developing a sinusoidal electrical signal the amplitude of which is proportional to the velocity of radial movement of the shaft at the first probe in the direction of the first probe, a first operational amplifier connected to the first probe for receiving and amplifying the developed signal from the first probe at one side thereof, a first voltage divider, a bias power supply connected across the first voltage divider and means the connecting a variable point of the first voltage divider to the other side of the first operational amplifier, whereby the output of the first operational amplifier may be reduced to zero with no input signal to the first operational amplifier from the first probe, a rectifier connected in series with the first operational amplifier for rectifying the output thereof, an integrating circuit connected to the rectifier for integrating the rectified sinusoidal output from the first operational amplifier, a first variable resistance connected to the integrating circuit for receiving the output thereof, means for tapping off a predetermined portion of he direct current output signal from the first variable resistance and means for recording the portion of the direct current output from the first variable resistance as a direct measure of shaft vibration magnitude, a second operational amplifier connected to receive the sinusoidal signal output of the first operational amplifier and providing a square wave output therefrom, a differentiating circuit connected to receive the square wave output signal of the first operational amplifier and to provide a pulsed output in response thereto, a second light sensitive probe positioned adjacent the shaft, means for abruptly changing the light reflective qualities of the shaft at one location around the circumference thereof for providing a pulse of electrical energy in the second probe each time the shaft completes a rotation relative to the second probe, a third operational amplifier connected to the second probe for sensing the pulses of electrical energy produced by the second probe and providing an output signal synchronized with the rotation of the shaft, a differentiating circuit for receiving the output signal from the third operational amplifier and providing a pulsed output in response thereto a dual NOR gate flip-flop circuit connected to receive the differentiated square wave signal from the second operational amplifier and the differentiated signals from the third operational amplifier so that one side of the flip-flop circuit provides an output signal between the time a signal is provided at the one side of the flip-flop circuit from the third operational amplifier and the time a signal is provided at the flip-flop circuit on the other side thereof from the second operational amplifier, means for integrating the output signal from the one side of the flip-flop circuit to provide a direct current signal proportional thereto, a second variable resistance for receiving the integrated output signal from the one side of the flip-flop circuit, a second voltage divider, a bias power supply connected across the second voltage divider, means for connecting a variable point on the second voltage divider between the integrating means receiving the output from the one side of the flip-flop circuit and the second variable resistor whereby the output signal of the flip-flop circuit to the second voltage divider can be maintained at zero with a zero input to the one side of the flip-flop circuit, and means for tapping off a portion of the direct current signal from the second variable resistance and for recording the portion of the signal from the second variable resistor as a direct indication of the phase angle of the vibration of the shaft.

* * * * *